United States Patent
Shoshi et al.

(10) Patent No.: US 6,896,960 B2
(45) Date of Patent: May 24, 2005

(54) ANTI-GLARE HARD COAT FILM

(75) Inventors: Satoru Shoshi, Koshigaya (JP); Osamu Inaoka, Saitama (JP); Yoshitaka Takesako, Tatsuno (JP)

(73) Assignee: Lintec Corporation, Tokyo (JP)

( * ) Notice: Subject to any disclaimer, the term of this patent is extended or adjusted under 35 U.S.C. 154(b) by 7 days.

(21) Appl. No.: 10/628,926

(22) Filed: Jul. 28, 2003

(65) Prior Publication Data

US 2004/0071986 A1 Apr. 15, 2004

(30) Foreign Application Priority Data

Aug. 28, 2002 (JP) ........................................ 2002-249269

(51) Int. Cl.$^7$ ................................................ B32B 9/00
(52) U.S. Cl. ........................ 428/323; 428/328; 428/331; 428/332; 428/334; 428/336; 428/429; 428/446; 428/447
(58) Field of Search ................................. 428/323, 331, 428/328, 332, 334, 336, 446, 447, 429

(56) References Cited

U.S. PATENT DOCUMENTS 6,731,363 B2 * 5/2004 Nakamura et al. .......... 349/137

FOREIGN PATENT DOCUMENTS

| JP | 06-18706 A | 1/1994 |
|---|---|---|
| JP | 10-18950 A | 7/1998 |
| JP | 2002-107512 | 4/2002 |

* cited by examiner

Primary Examiner—Monique R. Jackson
(74) Attorney, Agent, or Firm—Frishauf, Holtz, Goodman & Chick, P.C.

(57) ABSTRACT

An anti-glare hard coat film comprising an anti-glare hard coat layer disposed on at least one face of a transparent substrate film, wherein the anti-glare hard coat layer comprises (A) a resin cured by an ionizing radiation and, per 100 parts by weight of the cured resin, 0.2 to 10 parts by weight of (B) fine particles of silica and 1 to 20 parts by weight of (C) fine particles of a silicone resin. When this film is used for various displays, the excellent anti-glare property can be provided without decreasing the highly fine quality of displayed images. This film is also advantageously used as a protective film having a great surface hardness.

17 Claims, No Drawings

ANTI-GLARE HARD COAT FILM

BACKGROUND OF THE INVENTION

1. Field of the Invention

The present invention relates to an anti-glare hard coat film. More particularly, the present invention relates to an anti-glare hard coat film which can provide the excellent anti-glare property without decreasing the highly fine quality of displayed images, exhibits excellent visibility when it is used for various displays such as liquid crystal displays (LCD), plasma displays (PDP), cathode ray tubes (CRT) and touch panels, and is also advantageously used as a protective film due to a great surface hardness.

2. Description of Related Art

When a display such as CRT and LCD is used, light from the outside is occasionally reflected at the surface of the display (so-called glare) and difficulty arises in watching images on the display. In particular, as the size of flat panel displays increases recently, solving the above problem is becoming more important.

To solve the above problem, various methods for preventing glare have been used for various types of display. As an example of such methods for preventing glare, roughness is formed on the surface of hard coat films used for polarizing plates in liquid crystal displays and protective hard coat films for various types of display. The anti-glare methods for hard coat films can generally be divided into (1) methods in which roughness is formed on the surface of a hard coat film by a physical means during curing for forming a hard coat layer and (2) methods in which a filler is mixed into a hard coat material which is used for forming a hard coat layer.

Between these two types of method, the latter methods in which a filler is mixed into a hard coat material is mainly used and silica particles are mainly used as the filler. Silica particles are used because whiteness of the obtained hard coat film can be kept low, no decrease in the hardness takes place, and dispersion is excellent when silica particles are mixed into a hard coat material.

However, displays are recently becoming highly fine so that a high quality of images can be obtained and the conventional anti-glare methods for hard coat films are becoming insufficient. Although various methods such as introduction of aggregates of particles of colloidal silica into a hard coat layer have been attempted (Japanese Patent Application Laid-Open No. Heisei 10(1998)-180950), further improvement in the distinctness of image is desired.

A scratch-resistant anti-glare film in which an anti-glare layer composed of resin beads having a refractive index of 1.40 to 1.60 and a resin composition of the ionizing radiation curing type is disposed on a transparent substrate film is proposed (Japanese Patent Application Laid-Open No. Heisei 6(1994)-18706). In this anti-glare film, polymethyl methacrylate beads, polycarbonate beads, polystyrene beads, polyacryl styrene beads and polyvinyl chloride beads having a particle diameter in the range of 3 to 8 $\mu$m are used as the preferable resin beads. To prevent sedimentation of the resin beads in the coating material, silica beads having particle diameters of 0.5 $\mu$m or smaller are added in an amount less than about 0.1 parts by weight per 100 parts by weight of the resin of the ionizing radiation curing type.

In the publication of the above technology, fine particles of a silicone resin are not mentioned at all although typical resin beads having a relatively great particle diameter are dispersed in the anti-glare layer to provide the anti-glare property. The silica beads are added in a small amount to prevent sedimentation of the resin beads in the coating material and do not contribute to improvement in the anti-glare property at all.

A light diffusion sheet (an anti-glare sheet) in which a resin film layer having fine roughness on the surface is disposed on at least one face of a transparent substrate film is proposed (Japanese Patent Application Laid-Open No. 2002-107512). In this technology, fine particles are dispersed in the resin film layer to provide fine roughness on the surface of the resin film layer. As the fine particles, inorganic fine particles, organic fine particles and silicone-based fine particles can be used and organic fine particles are preferable. Polystyrene beads and melamine beads are used as the fine particles in the examples and silica beads and silicone particles are used as the fine particles in the comparative examples. This suggests that silica beads and silicone particles are not preferable for providing the anti-glare property.

SUMMARY OF THE INVENTION

The present invention has an object of providing an anti-glare hard coat film which can provide the excellent anti-glare property without decreasing the highly fine quality of displayed images, exhibits excellent visibility when it is used for various displays, and is also advantageously used as a protective film due to a great surface hardness.

As the result of intensive studies by the present inventors to develop the anti-glare hard coat film having the above excellent properties, it was found that a hard coat film exhibiting unexpectedly more excellent distinctness of image by the transmission method and smaller specular glossiness than those of conventional films could be obtained when a combination of fine particles of silica and fine particles of a silicone resin and, preferably, a combination of fine particles of silica having the average diameter in a specific range and fine particles of a silicone resin having the average diameter in a specific range, was introduced into a hard coat layer each in a specific relative amount and the object of the present invention could be achieved with the film. The present invention was completed based on the knowledge.

The present invention provides:

(1) An anti-glare hard coat film comprising a transparent substrate film and an anti-glare hard coat layer disposed at least on one face of the transparent substrate film, wherein the anti-glare hard coat layer comprises (A) a resin cured by an ionizing radiation and, per 100 parts by weight of the cured resin, 0.2 to 10 parts by weight of (B) fine particles of silica and 1 to 20 parts by weight of (C) fine particles of a silicone resin;

(2) An anti-glare hard coat film as described in (1), wherein the fine particles of a silicone resin of component (C) in the anti-glare hard coat layer are fine particles of polyorganosilsesquioxane having a crosslinked structure forming a three-dimensional network;

(3) An anti-glare hard coat film as described in any one of (1) and (2), wherein, in the anti-glare hard coat layer, an average diameter ($d_B$) of the fine particles of silica of component (B) is in a range of 0.1 to 5 $\mu$m, an average diameter ($d_C$) of the fine particles of a silicone resin of component (C) is in a range of 0.1 to 3 $\mu$m, and a ratio of $d_C$ to $d_B$ ($d_C/d_B$) is in a range of 0.5 to 1; and (4) An anti-glare hard coat film as described in any one of (1) to (3), wherein a thickness of the anti-glare hard coat layer is in a range 0.5 to 20 $\mu$m.

DESCRIPTION OF THE PREFERRED EMBODIMENTS

The substrate film in the anti-glare hard coat film of the present invention is not particularly limited and a suitable plastic film can be selected from conventional plastic films which are used as the substrate film in optical hard coat films. Examples of the plastic film include films of polyesters such as polyethylene terephthalate, polybutylene terephthalate and polyethylene naphthalate, polyethylene films, polypropylene films, cellophane, diacetylcellulose films, triacetylcellulose films, acetylcellulose butyrate films, polyvinyl chloride films, polyvinylidene chloride films, polyvinyl alcohol films, ethylene-vinyl acetate copolymer films, polystyrene films, polycarbonate films, polymethylpentene films, polysulfone films, polyether ether ketone films, polyether sulfone films, polyether imide films, polyimide films, fluororesin films, polyamide films and acrylic resin films.

The substrate film may be transparent or translucent and may be colored or colorless. These properties can be suitably selected in accordance with the application. For example, when the hard coat film is used as a protective film of a liquid crystal display, a colorless transparent film is preferable.

The thickness of the substrate film is not particularly limited and suitably selected in accordance with the situation. The thickness is, in general, in the range of 15 to 250 $\mu$m and preferably in the range of 30 to 200 $\mu$m. One or both surfaces of the substrate film may be treated, for example, by oxidation or by a treatment of forming rough surfaces, where desired, so that adhesion with layers disposed on the surfaces is enhanced. Examples of the treatment of the surface by oxidation include the treatment by corona discharge, the treatment with chromic acid (a wet process), the treatment with flame, the treatment with heated air or irradiation with ultraviolet light in the presence of ozone. Examples of the treatment of forming rough surfaces include the treatment by sand blasting and the treatment with a solvent. The surface treatment is suitably selected in accordance with the type of the substrate film. In general, the treatment by corona discharge is preferable from the standpoint of the effect and the operability.

The anti-glare hard coat film of the present invention comprises a hard coat layer at least on one face of the above substrate film. The hard coat layer comprises(A) a resin cured by an ionizing radiation and (B) fine particles of silica and (C) fine particles of a silicone resin dispersed in component (A).

The hard coat layer can be formed by coating at least one face of the substrate film with a coating fluid for forming a hard coat layer which comprises a compound curable by an ionizing radiation used for forming component (A), the fine particles of silica of component (B), the fine particles of a silicone resin of component (C) and, where desired, a photopolymerization initiator to form a coating layer, followed by curing the coating layer by exposure to the ionizing radiation.

As the above compound curable by an ionizing radiation used for forming component (A), at least one compound selected from photopolymerizable prepolymers and photopolymerizable monomers can be used. The photopolymerizable prepolymer include prepolymers of the radical polymerization type and prepolymers of the cationic polymerization type. Examples of the prepolymer of the radical polymerization type include prepolymers based on polyester acrylates, epoxyacrylates, urethane acrylates and polyol acrylates. The polyester acrylate-based prepolymer can be obtained, for example, by obtaining a polyester oligomer having hydroxyl groups at the ends by condensation of a polyfunctional carboxylic acid and a polyhydric alcohol, followed by esterification of the hydroxyl groups in the obtained oligomer with (meth)acrylic acid; or by obtaining an oligomer having hydroxyl groups at the ends by addition of an alkylene oxide to a polyfunctional carboxylic acid, followed by esterification of the hydroxyl groups of the obtained oligomer with (meth)acrylic acid. The epoxyacrylate-based prepolymer can be obtained, for example, by esterification of oxirane rings in an epoxy resin of a bisphenol type or a novolak type having a relatively low molecular weight by the reaction with (meth)acrylic acid. The urethane acrylate-based prepolymer can be obtained, for example, by obtaining a polyurethane oligomer by the reaction of a polyether polyol or a polyester polyol with a polyisocyanate, followed by esterification of the obtained oligomer with (meth)acrylic acid. The polyol acrylate-based prepolymer can be obtained, for example, by esterification of hydroxyl groups in a polyether polyol with (meth)acrylic acid. The above photo-polymerizable prepolymers may be used singly or in combination of two or more.

As the photopolymerizable prepolymer of the cationic polymerization type, in general, epoxy resins are used. Examples of the epoxy resin include compounds obtained by epoxidation of polyhydric phenols such as bisphenol resins and novolak resins with epichlorohydrin and compounds obtained by oxidation of linear olefin compounds and cyclic olefin compounds with peroxides.

Examples of the photopolymerizable monomer include polyfunctional acrylates such as 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, neopentyl glycol hydroxypivalate di(meth)acrylate, dicyclopentanyl di(meth)acrylate, dicyclopentenyl di(meth)acrylate modified with caprolactone, di(meth)acrylate of phosphoric acid modified with ethylene oxide, cyclohexyl di(meth)acrylate substituted with allyl group, isocyanurate di(meth)acrylate, trimethylolpropane tri(meth)acrylate, dipentaerythritol tri(meth)acrylate, dipentaerythritol tri(meth)acrylate modified with propionic acid, pentaerythritol tri(meth)acrylate, trimethylolpropane tri(meth)acrylate modified with propylene oxide, tris(acryloxyethyl) isocyanurate, dipentaerythritol penta(meth)acrylate modified with propionic acid, dipentaerythritol hexa(meth)acrylate and dipentaerythritol hexa(meth)acrylate modified with caprolactone. The above photopolymerizable monomers may be used singly or in combination of two or more. The photopolymerizable monomer may be used in combination with the photopolymerizable prepolymer described above.

Examples of the photopolymerization initiator for the photo-polymerizable prepolymers and the photopolymerizable monomers of the radical polymerization type, which is used where desired, include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)-phenyl]-2-morpholino-propane-1-one, 4-(2-hydroxyethoxy)phenyl 2-(hydroxy-2-propyl) ketone, benzophenone, p-phenylbenzophenone, 4,4'-diethylaminobenzophenone, dichlorobenzophenone, 2-methylanthraquinone, 2-ethylanthraquinone, 2-tertiarybutylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal and p-dimethyl-aminobenzoates. Examples of the photopolymerization initiator for the photopolymerizable prepolymers of the cationic polymerization type include compounds composed of oniums such as aromatic sulfonium ions, aromatic oxosulfonium ions and aromatic iodonium ions and anions such as tetrafluoroborates, hexafluorophosphates, hexafluoroantimonates and hexafluoroarsenates. The above photopolymerization initiators may be used singly or in combination of two or more. The amount is, in general, selected in the range of 0.2 to 10 parts by weight per 100 parts by weight of the photopolymerizable prepolymer, the photopolymerizable monomer or the both compounds.

It is preferable that the anti-glare film of the present invention has the following optical properties so that the object of the present invention is achieved.

The haze and the 60° specular glossiness indicate the anti-glare property of the anti-glare hard coat film of the present invention. It is preferable that the haze is 3% or greater and the 60° specular glossiness is 50 or smaller. When the haze is smaller than 3%, it is difficult that the sufficient anti-glare property is exhibited. When the 60° specular glossiness exceeds 50, the gloss of the surface is great, i.e., the reflection of light is great, and the anti-glare property is adversely affected. A very great haze is not preferable since the light transmittance decreases. It is preferable that the total value of distinctness of image by the transmission method is 200 or greater. The total value of distinctness of image by the transmission method indicates the quality of displayed images, i.e., the visibility. When this value is smaller than 200, sufficiently excellent quality of displayed images, i.e., sufficient visibility, cannot be obtained. It is preferable that the total light transmittance is 90% or greater. When the total light transmittance is smaller than 90%, there is the possibility that the transparency is insufficient. It is preferable that the reflectivity at the wavelength of 550 nm is 3.5% or smaller.

From the standpoint of the balance between the anti-glare property, the quality of displayed images, i.e., the visibility, the light transmittance and the transparency, it is more preferable that the haze is in the range of 3 to 50%, the total value of distinctness of image by the transmission method is 220 or greater, and the total light transmittance is 92% or greater. The methods of measurements of these optical properties will be described later.

In the present invention, components (B) and (C) described in the following are used in combination with component (A) and dispersed in the hard coat layer so that the above optical properties are exhibited.

In the anti-glare film of the present invention, in general, fine particles of silica having an average diameter ($d_B$) of 0.1 to 5 μm are used as the fine particles of silica of component (B) dispersed in the hard coat layer. When the average particle diameter is smaller than 0.1 μm, the secondary aggregation tends to take place. When the average particle diameter exceeds 5 μm, the surface of the hard coat layer becomes excessively rough to decrease the visibility and the object of the present invention is not achieved, occasionally. From the standpoint of the prevention of the secondary aggregation and the visibility, it is preferable that the average diameter of the fine particles of silica is in the range of 0.5 to 4 μm and more preferably in the range of 1 to 3 μm.

The fine particles of silica is used in an amount in the range of 0.2 to 10 parts by weight per 100 parts by weight of the resin cured by an ionizing radiation described above. When the amount of the fine particles of silica is less than 0.2 parts by weight, the 60° specular glossiness exceeds 50 and the sufficient anti-glare property cannot be obtained. When the amount exceeds 10 parts by weight, the total value of distinctness of image by the transmission method becomes smaller than 200 and the quality of displayed images deteriorates. From the standpoint of the anti-glare property and the prevention of deterioration in the quality of displayed images, it is preferable that the amount of the fine particles of silica is in the range of 0.5 to 7 parts by weight and more preferably in the range of 1 to 5 parts by weight.

The fine particles of a silicone resin of component (C) which are dispersed in the hard coat layer in combination with the fine particles of silica described above are not particularly limited. From the standpoint of the properties, fine particles of a polyorganosilsesquioxane having a siloxane bond and a crosslinked structure forming a three-dimensional network which is represented by the following general formula [1]:

　　　　　　　　　　　　　　　　　　　　[1]

wherein R represents an organic group and n represents the degree of polymerization, are preferable.

The above fine particles of a polyorganosilsesquioxane can be obtained, for example, by polymerizing in a suitable organic solvent an organotrialkoxysilane represented by general formula [2]:

　　　　　　　　　　　　　　　　　　　　[2]

wherein $R^1$ represents a non-hydrolyzable group selected from alkyl groups having 1 to 20 carbon atoms, alkyl groups having 1 to 20 carbon atoms and a group selected from (meth)acryloyloxy group and epoxy group, alkenyl groups having 2 to 20 carbon atoms, aryl groups having 6 to 20 carbon atoms and aralkyl groups having 7 to 20 carbon atoms; $R^2$ represents an alkyl group having 1 to 6 carbon atoms; and three groups represented by $OR^2$ may be the same with or different from each other.

As the alkyl group having 1 to 20 carbon atoms among the groups represented by $R^1$ in general formula [2], alkyl groups having 1 to 10 carbon atoms are preferable and the alkyl groups may be any of linear, branched and cyclic groups. Examples of the alkyl group include methyl group, ethyl group, n-propyl group, isopropyl group, n-butyl group, isobutyl group, sec-butyl group, tert-butyl group, pentyl group, hexyl group, octyl group, cyclopentyl group and cyclohexyl group. As the alkyl group having 1 to 20 carbon atoms and a group selected from (meth)acryloyloxy group and epoxy group described above, alkyl groups having 1 to 10 carbon atoms and the above group are preferable and the alkyl groups may be any of linear, branched and cyclic groups. Examples of the alkyl group having the above group include γ-acryloyloxypropyl group, γ-methacryloyloxy group, γ-glycidoxypropyl group and 3,4-epoxycyclohexyl group. As the alkenyl group having 2 to 20 carbon atoms, alkenyl groups having 2 to 10 carbon atoms are preferable and the alkenyl groups may be any of linear, branched and cyclic groups. Examples of the alkenyl group include vinyl group, allyl group, butenyl group, hexenyl group and octenyl group. As the aryl group having 6 to 20 carbon atoms, aryl groups having 6 to 10 carbon atoms are preferable. Examples of the aryl group include phenyl group, tolyl group, xylyl group and naphthyl group. As the aralkyl group having 7 to 20 carbon atoms, aralkyl groups having 7 to 10 carbon atoms are preferable. Examples of the aralkyl group include benzyl group, phenetyl group, phenylpropyl group and naphthylmethyl group.

The alkyl group having 1 to 6 carbon atoms which is represented by $R^2$ may be any of liner, branched and cyclic groups. Examples of the alkyl group represented by $R^2$ include methyl group, ethyl group, n-propyl group, isopropyl group, n-butyl group, isobutyl group, sec-butyl group, tert-butyl group, pentyl group, hexyl group, cyclopentyl group and cyclohexyl group. Three groups represented by $OR^2$ may be the same with or different from each other.

Examples of the organotrialkoxysilane represented by general formula [2] include methyltrimethoxysilane, methyltriethoxysilane, methyltripropoxysilane, methyltriisopropoxysilane, ethyltrimethoxysilane, ethyltriethoxysilane, propyltriethoxysilane, butyltrimethoxysilane, phenyltrimethoxysilane, phenyltriethoxysilane, vinyltrimethoxysilane, vinyltriethoxysilane, γ-glycydoxypropyltrimethoxysilane, γ-acryloyloxypropyltrimethoxysilane and γ-methacryloyloxypropyltrimethoxysilane. The organotrialkoxysilane may be used singly or in combination of two or more.

Examples of the organic solvent used for hydrolysis and polycondensation of the organotrialkoxysilane include aromatic hydrocarbons such as benzene, toluene and xylene; esters such as methyl acetate, ethyl acetate and propyl acetate; ketones such as acetone, methyl ethyl ketone, methyl isobutyl ketone and cyclohexanone; and alcohols such as methyl alcohol, ethyl alcohol, n-propyl alcohol, isopropyl alcohol, n-butyl alcohol and isobutyl alcohol.

Examples of the commercial product of the fine particles of polyorganosilsesquioxane include products manufactured by SHIN-ETSU CHEMICAL Co., Ltd. and distributed with trade names of "X-52 series"

In the present invention, it is preferable that the average diameter ($d_C$) of the fine particles of the silicone resin used as component (C) is in the range of 0.1 to 3 μm and the ratio of the average diameter ($d_C$) of the fine particles of the silicone resin to the average diameter of the fine particles of silica ($d_B$), i.e., ($d_C/d_B$), is in the range of 0.5 to 1.

When the fine particles of silica and the fine particles of the silicone resin having the above properties are used in combination, the fine particles of the silicone resin tend to be present more densely in the vicinity of the surface layer of the hard coat layer. The fine particles of the silicone resin has a refractive index of about 1.43. The fine particles of silica has a refractive index of about 1.45 to 1.46. It is considered that the anti-glare film having the excellent distinctness of image by the transmission method and the small specular glossiness can be obtained based on the above results. When the fine particles of silica of component (B) is used singly, a problem arises in that the distinctness of image by the transmission method is poor and the quality of displayed images inevitably deteriorates although an excellent anti-glare property can be obtained.

The fine particles of the silicone resin of component (C) exhibit the effect of maintaining the excellent anti-glare property of the fine particles of silica and, at the same time, suppressing the deterioration in the quality of images by improving the distinctness of image by the transmission method. When the average diameter of the fine particles of the silicone resin is outside the above range, it is difficult that the above effect is sufficiently exhibited. From the standpoint of the above effect, it is more preferable that the average diameter of the fine particles of the silicone resin is in the range of 0.3 to 2.5 μm and most preferably in the range of 0.4 to 2 μm.

The fine particles of the silicone resin of component (C) is used in an amount in the range of 1 to 20 parts by weight per 100 parts by weight of the resin cured by an ionizing radiation. When the amount of component (C) is less than 1 part by weight, the 60° specular glossiness exceeds 50 and the effect of suppressing the decrease in the quality of displayed images is not exhibited sufficiently. When the amount of component (C) exceeds 20 parts by weight, the total value of distinctness of image by the transmission method becomes smaller than 200 and the transparency deteriorates. When the 60° specular glossiness and the total value of distinctness of image by the transmission method are considered, it is preferable that the amount of the fine particles of the silicone resin is in the range of 2 to 10 parts by weight and more preferably in the range of 3 to 7 parts by weight.

The coating fluid for forming the hard coat layer used in the present invention can be prepared by adding the compound curable by an ionizing radiation, the fine particles of silica, the fine particles of the silicone resin and various additives which are used where desires such as antioxidants, ultraviolet light absorbents, light stabilizers, leveling agents and defoaming agents in each specific amount to a suitable solvent which is used where necessary and dissolving or dispersing the above components into the solvent.

Examples of the solvent used in the above include aliphatic hydrocarbons such as hexane, heptane and cyclohexane; aromatic hydrocarbons such as toluene and xylene; halogenated hydrocarbons such as methylene chloride and ethylene chloride; alcohols such as methanol, ethanol, propanol and butanol; ketones such as acetone, methyl ethyl ketone, 2-pentanone, isophorone and cyclohexanone; esters such as ethyl acetate and butyl acetate; and cellosolve solvents such as ethylcellosolve.

The concentration and the viscosity of the coating liquid thus prepared are not particularly limited as long as the coating fluid can be used for coating and can be suitably selected in accordance with the situation.

The coating fluid prepared above is applied at least to one face of the substrate film described above in accordance with a conventional process such as the bar coating process, the knife coating process, the roll coating process, the blade coating process, the die coating process and the gravure coating process to form a coating layer. After the formed coating layer is dried, the hard coat layer is formed by curing the coating layer by exposure to an ionizing radiation.

Examples of the ionizing radiation include ultraviolet light and electron beams. Ultraviolet light can be obtained from a high pressure mercury lamp, a fusion H lamp or a xenon lamp. The amount of the light used for the irradiation is, in general, in the range of 100 to 500 mJ/cm$^2$. Electron beams are obtained from an electron accelerator. The amount of the beams used for the irradiation is, in general, in the range of 150 to 350 kV. Between these ionizing radiations, ultraviolet light is preferable. When the electron beams are used, the cured film can be obtained without adding a polymerization initiator.

It is preferable that the hard coat layer thus formed has a thickness in the range of 0.5 to 20 μm. When the thickness is smaller than 0.5 μm, there is the possibility that the scratch resistance of the hard coat film is not sufficiently exhibited. When the thickness exceeds 20 μm, there is the possibility that the 60° specular glossiness increases. From the standpoint of the balance between the scratch resistance and the 60° specular glossiness, it is more preferable that the thickness of the hard coat layer is in the range of 1 to 15 μm and most preferably in the range of 2 to 10 μm.

It is preferable that the hard coat layer in the anti-glare hard coat film of the present invention has a pencil hardness of H or higher. The scratch resistance sufficient for the hard coat film can be provided when the pencil hardness is H or higher. It is preferable that the hard coat layer has a pencil hardness of 2H or higher so that the scratch resistance is more sufficiently exhibited. The method of measurement of the pencil hardness will be described later.

In the present invention, where necessary, a layer for preventing reflection of light such as a siloxane-based coating film and fluorine-based coating film may be formed on the surface of the hard coat layer to provide the property of preventing reflection of light. It is suitable that the layer for preventing reflection of light has a thickness in the range of about 0.05 to 1 μm. Disturbance of images on the display by reflection of light from the sun or the fluorescent light can be prevented by disposing the layer for preventing reflection of light. The total light transmittance can be increased and the transparency can be improved by suppressing reflection of light at the surface. The antistatic property can also be improved by suitably selecting the type of the layer for preventing reflection of light.

In the anti-glare hard coat film of the present invention, an adhesive layer for attaching the had coat film to an adherent such as a liquid crystal display may be formed on the face of the substrate film opposite to the face having the hard coat layer. As the adhesive forming the adhesive layer, adhesives for optical applications such as acrylic-based adhesives, urethane-based adhesives and silicone-based adhesives are preferable. The thickness of the adhesive layer is, in general, in the range of 5 to 100 μm and preferably in the range of 10 to 60 μm.

A release film may be disposed on the adhesive layer. Examples of the release film include release films prepared by coating paper such as glassine paper, coated paper and laminate paper or a plastic film with a release agent such as a silicone resin. The thickness of the release film is not particularly limited. In general, the thickness of the release film is in the range of 20 to 150 μm.

To summarize the advantages of the present invention, the anti-glare hard coat film can provide the anti-glare property without decreasing the highly fine quality of displayed images, exhibits excellent visibility when it is used for various displays such as liquid crystal displays (LCD), plasma displays (PDP), cathode ray tubes (CRT) and touch panels, and is also advantageously used as a protective film due to a great surface hardness.

EXAMPLES

The present invention will be described more specifically with reference to examples in the following. However, the present invention is not limited to the examples.

The properties of an anti-glare hard coat films were measured in accordance with the following methods.
(1) Total Light Transmittance and Haze The total light transmittance and the haze were measured in accordance with the method of Japanese Industrial Standard K7105 using a haze meter manufactured by NIPPON DENSHOKU KOGYO Co., Ltd.
(2) 60° Specular Glossiness The 60° specular glossiness was measured in accordance with the method of Japanese Industrial Standard K7105 using a gloss meter manufactured by NIPPON DENSHOKU KOGYO Co., Ltd.
(3) Total Value of Distinctness of Image by the Transmission Method The total value of distinctness of image by the transmission method was measured in accordance with the method of Japanese Industrial Standard K7105 using an apparatus for measuring the image-forming property manufactured by SUGA TEST INSTRUMENTS Co., Ltd. The sum of the values obtained by the measurements by the transmission method using four types of slit was used as the total value of distinctness of image by the transmission method.
(4) Reflectivity The reflectivity of light having a wavelength of 550 nm at the surface of a hard coat film was measured using a spectrophotometer for ultraviolet light and visible light "UV-3101PC" manufactured by SHIMADZU CORPORATION.
(5) Pencil Hardness The pencil hardness was measured by hand scratching in accordance with the method of Japanese Industrial Standard K5400.
(6) Scratch Resistance The surface of a coated layer of a hard coat film was rubbed with steel wool #0000 and the condition of the surface was visually observed. When no scratches were found on the surface, the result was evaluated as good. When scratches were found on the surface, the result was evaluated as poor.

Example 1

To 100 parts by weight of a resin curable by ultraviolet light [manufactured by ARAKAWA KAGAKU KOGYO Co., Ltd.; the trade name: "BEAMSET 575CB"; a urethane acrylate-based resin; the concentration of solid components: 100%], 6 parts by weight of fine particles of a silicone resin [manufactured by SHIN-ETSU CHEMICAL Co., Ltd.; the trade name: "X-52-854"; fine particles of polyorganosilsesquioxane; the average particle diameter: 0.8 μm] and 2 parts by weight of fine particles of silica [manufactured by FUJI SILYSIA CHEMICAL, Ltd.; SYLYSIA 420; the average particle diameter: 1.0 μm] were added. The resultant mixture was diluted with a mixed solvent composed of cyclohexanone and ethylcellosolve in relative amounts by weight of 1/1 so that the concentration of the solid components in the entire mixture was adjusted at 45% by weight and a coating material was prepared. The value of $d_C/d_B$ was 0.8.

One face of a triacetylcellulose film (a TAC film) having a thickness of 80 μm was coated with the coating material prepared above using a Mayer bar No. 8. After the formed coating layer was dried at 70° C. for 1 minute, the layer was exposed to ultraviolet light in an amount of 250 mJ/cm$^2$ and cured. Thus, a hard coat layer having a thickness of 4.5 μm was formed and an anti-glare hard coat film was prepared.

The properties of the anti-glare had coat film are shown in Table 1.

Examples 2 and 3

Anti-glare hard coat films were prepared in accordance with the same procedures as those conducted in Example 1 using the fine particles of the silicone resin and the fine particles of silica in amounts shown in Table 1. The properties of the prepared anti-glare had coat films are shown in Table 1.

Example 4

An anti-glare hard coat film was prepared in accordance with the same procedures as those conducted in Example 1 using the fine particles of the silicone resin and the fine particles of silica in amounts shown in Table 1.

The back face of the prepared anti-glare hard coat film was coated with an acrylic adhesive [manufactured by LINTEC Corporation; "PA-T1"] in an amount such that the dried film had a thickness of 20 μm. After the adhesive layer was dried, a release film prepared by treating a polyethylene terephthalate film with a silicone to provide the releasing property was laminated to the adhesive layer and an adhesive sheet was prepared.

The results of evaluation of the properties of the prepared anti-glare hard coat film are shown in Table 1.

Comparative Example 1

An anti-glare hard coat film was prepared in accordance with the same procedures as those conducted in Example 1 except that no fine particles of a silicone resin were added and 6 parts by weight of the fine particles of silica were added. The properties of the anti-glare hard coat film are shown in Table 1.

Comparative Example 2

An anti-glare hard coat film was prepared in accordance with the same procedures as those conducted in Example 1 except that no fine particles of silica were added and 7 parts by weight of the fine particles of the silicone resin were added. The properties of the anti-glare hard coat film are shown in Table 1.

Comparative Example 3

An anti-glare hard coat film was prepared in accordance with the same procedures as those conducted in Example 1 except that 15 parts by weight of polystyrene beads having an average particle diameter of 3 μm were used in place of the fine particles of the silicone resin and no fine particles of silica were added. The properties of the anti-glare hard coat film are shown in Table 1.

Comparative Example 4

An anti-glare hard coat film was prepared in accordance with the same procedures as those conducted in Example 1 except that 4 parts by weight of polymethyl methacrylate (PMMA) beads having an average particle diameter of 5 μm were used in place of the fine particles of the silicone resin and 0.2 parts by weight of fine particles of silica having an average diameter of 0.25 μm were used in place of the fine particles of silica having an average diameter of 1.0 μm. The properties of the anti-glare hard coat film are shown in Table 1.

TABLE 1

|  | Example | | | | Comparative Example | | | |
|---|---|---|---|---|---|---|---|---|
|  | 1 | 2 | 3 | 4 | 1 | 2 | 3 | 4 |
| Amount of added particles (part by weight) | | | | | | | | |
| silicone resin (0.8 μm) | 6 | 7 | 4 | 5 | — | 7 | — | — |
| silica (1.0 μm) | 2 | 1 | 5 | 3 | 6 | — | — | — |
| silica (0.25 μm) | — | — | — | — | — | — | — | 0.2 |
| polystyrene (3 μm) | — | — | — | — | — | — | 15 | — |
| PMMA (5 μm) | — | — | — | — | — | — | — | 4 |
| $d_C/d_B$ | 0.8 | 0.8 | 0.8 | 0.8 | — | — | — | — |
| Properties of film | | | | | | | | |
| total light transmittance (%) | 93.1 | 93.0 | 92.1 | 92.8 | 91.4 | 91.6 | 90.3 | 91.1 |
| haze (%) | 40.6 | 36.8 | 49.2 | 35.5 | 15.2 | 30.5 | 50.1 | 15.3 |
| 60° specular glossiness | 12.4 | 15.7 | 28.0 | 17.9 | 57.1 | 68.4 | 42.7 | 91.9 |
| total value of distinctness of image | 265.1 | 254.6 | 222.5 | 231.1 | 160.0 | 180.2 | 81.9 | 173.8 |
| reflectivity (%) | 2.8 | 2.9 | 33 | 3.0 | 4.6 | 4.4 | 5.1 | 4.4 |
| pencil hardness | 2H | 2H | 2H | 2H | 2H | 2H | H | 2H |
| scratch resistance | good | good | good | good | good | good | good | good |

Note:
1. Values in ( ) in the amount of added particles show the average particle diameters.
2. Total value of distinctness of image was measured by the transmission method.

As shown in Table 1, the anti-glare hard coat films of Examples all had the total light transmittance, the haze, the 60° C. specular glossiness and the total value of distinctness of image by the transmission method in the preferable ranges and exhibited the excellent anti-glare property and the excellent distinctness of image by the transmission method.

What is claimed is:

1. An anti-glare hard coat film comprising a transparent substrate film and an anti-glare hard coat layer disposed at least on one face of the transparent substrate film, wherein said anti-glare hard coat layer comprises (A) a resin cured by an ionizing radiation and, per 100 parts by weight of said cured resin, 0.2 to 10 parts by weight of (B) fine particles of silica and 1 to 20 parts by weight of (C) fine particles of a silicone resin, and a total value of distinctness of image of said hard coat film measured by the transmission method in accordance with the method of Japanese Industrial Standard K7105 is 200 or greater.

2. An anti-glare hard coat film according to claim 1, wherein the fine particles of a silicone resin of component (C) in the anti-glare hard coat layer are fine particles of polyorganosilsesquioxane having a crosslinked structure forming a three-dimensional network.

3. An anti-glare hard coat film according to claim 1, wherein, in the anti-glare hard coat layer, an average diameter ($d_B$) of the fine particles of silica of component (B) is in a range of 0.1 to 5 μm, an average diameter ($d_C$) of the fine particles of a silicone resin of component (C) is in a range of 0.1 to 3 μm, and a ratio of $d_C$ to dB ($d_C/d_B$) is in a range of 0.5 to 1.

4. An anti-glare hard coat film according to claim 2, wherein, in the anti-glare hard coat layer, an average diameter ($d_B$) of the fine particles of silica of component (B) is in a range of 0.1 to 5 μm, an average diameter ($d_C$) of the fine particles of a silicone resin of component (C) is in a range of 0.1 to 3 μm, and a ratio of $d_C$ to $d_B$ ($d_C/d_B$) is in a range of 0.5 to 1.

5. An anti-glare hard coat film according to claim 1, wherein a thickness of the anti-glare hard coat layer is in a range of 0.5 to 20 μm.

6. An anti-glare hard coat film according to claim 2, wherein a thickness of the anti-glare hard coat layer is in a range of 0.5 to 20 μm.

7. An anti-glare hard coat film according to claim 3, wherein a thickness of the anti-glare hard coat layer is in a range of 0.5 to 20 μm.

8. An anti-glare hard coat film according to claim 4, wherein a thickness of the anti-glare hard coat layer is in a range of 0.5 to 20 μm.

9. An anti-glare hard coat film according to claim 5, wherein the thickness of the anti-glare hard coat layer is in a range of 2 to 10 μm.

10. An anti-glare hard coat film according to claim 6, wherein the thickness of the anti-glare hard coat layer is in a range of 2 to 10 μm.

11. An anti-glare hard coat film according to claim 9, wherein the an average diameter ($d_C$) of the fine particles of a silicone resin of component (C) is in a range of 0.2 to 2 μm.

12. An anti-glare hard coat film according to claim 10, wherein the average diameter ($d_C$) of the fine particles of a silicone resin of component (C) is in a range of 0.2 to 2 μm.

13. An anti-glare hard coat film according to claim 1, wherein the hard coat film has a haze in the range of 3 to 50%, a total light transmittance of 90% or greater, a 60° specular glossiness of 50 or smaller and a reflectivity at wave length of 550 nm is 3.5% or smaller, said haze, said total light transmittance and said 60° specular glossiness being measured in accordance with the method of Japanese Industrial Standard K7105 and said reflectivity being measured by using a spectrophotometer for ultraviolet light and visible light.

14. An anti-glare hard coat film according to claim 2, wherein the hard coat film has a haze in the range of 3 to 50%, a total light transmittance of 90% or greater, a 60° specular glossiness of 50 or smaller and a reflectivity at wave length of 550 nm is 3.5% or smaller, said haze, said total light transmittance and said 60° specular glossiness being measured in accordance with the method of Japanese Industrial Standard K7105 and said reflectivity being measured by using a spectrophotometer for ultraviolet light and visible light.

15. An anti-glare hard coat film according to claim 11, wherein the hard coat film has a haze in the range of 3 to 50%, a total light transmittance of 90% or greater, a 60° specular glossiness of 50 or smaller and a reflectivity at wave length of 550 nm is 3.5% or smaller, said haze, said total light transmittance and said 60° specular glossiness being measured in accordance with the method of Japanese Industrial Standard K7105 and said reflectivity being measured by using a spectrophotometer for ultraviolet light and visible light.

16. An anti-glare hard coat film according to claim 12, wherein the hard coat film has a haze in the range of 3 to 50%, a total light transmittance of 90% or greater, a 60° specular glossiness of 50 or smaller and a reflectivity at wave length of 550 nm is 3.5% or smaller, said haze, said total light transmittance and said 60° specular glossiness being measured in accordance with the method of Japanese Industrial Standard K7105 and said reflectivity being measured by using a spectrophotometer for ultraviolet light and visible light.

17. An anti-glare hard coat film according claim 1, wherein component (B) and (C) are dispersed in the hard coat layer in a manner such that said component (C) tends to be present more densely in the vicinity of the surface layer of the hard coat layer.

* * * * *